United States Patent
Nakajima et al.

(10) Patent No.: US 12,054,011 B2
(45) Date of Patent: Aug. 6, 2024

(54) PNEUMATIC TIRE

(71) Applicant: SUMITOMO RUBBER INDUSTRIES, LTD., Hyogo (JP)

(72) Inventors: Hiroki Nakajima, Hyogo (JP); Takuma Yoshizumi, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 428 days.

(21) Appl. No.: 16/641,732

(22) PCT Filed: Sep. 3, 2018

(86) PCT No.: PCT/JP2018/032660
§ 371 (c)(1),
(2) Date: Feb. 25, 2020

(87) PCT Pub. No.: WO2019/054226
PCT Pub. Date: Mar. 21, 2019

(65) Prior Publication Data
US 2020/0247193 A1 Aug. 6, 2020

(30) Foreign Application Priority Data
Sep. 12, 2017 (JP) .................................. 2017-175248

(51) Int. Cl.
*B60C 15/06* (2006.01)
*B60C 19/00* (2006.01)
(Continued)

(52) U.S. Cl.
CPC .............. *B60C 15/06* (2013.01); *B60C 19/00* (2013.01); *B60C 23/0433* (2013.01); *B60C 2015/0614* (2013.01)

(58) Field of Classification Search
CPC . B60C 15/06; B60C 15/0603; B60C 15/0607; B60C 23/00; B60C 2019/006;
(Continued)

(56) References Cited

U.S. PATENT DOCUMENTS 5,098,941 A * 3/1992 Tsuriya ................... B60C 15/06
524/270
2001/0042583 A1* 11/2001 Corvasce ................ C08L 21/00
526/329.2
(Continued)

FOREIGN PATENT DOCUMENTS

JP 2000-108619 4/2000
JP 2006-168473 6/2006
(Continued)

OTHER PUBLICATIONS

ISR issued in Application No. PCT/JP2018/032660, dated Dec. 4, 2018, English translation.
(Continued)

*Primary Examiner* — Justin R Fischer
(74) *Attorney, Agent, or Firm* — Greenblum & Bernstein, P.L.C.

(57) ABSTRACT

Provided is a tire manufacturing feature in which even when an electronic component is embedded in a tire, damage due to impact load during traveling on the road surface is inhibited and the durability of the tire is prevented from deteriorating. A pneumatic tire provided with: a bead reinforcing layer provided in the tire-axial-direction outer side of the carcass of a bead part the bead reinforcing layer reinforcing the bead part from the outer side of the carcass; a clinch member provided on the tire-axial-direction outer side of the bead reinforcing layer; and an electronic device. The clinch member has a rigidity lower than that of the bead
(Continued)

reinforcing layer, and the electronic component is embedded between the bead reinforcing layer and the clinch member.

15 Claims, 5 Drawing Sheets

(51) Int. Cl.
*B60C 23/00* (2006.01)
*B60C 23/04* (2006.01)

(58) Field of Classification Search
CPC .... B60C 2015/0614; B60C 2015/0617; B60C 2015/0621; B60C 23/0408; B60C 23/0491; B60C 23/0493
See application file for complete search history.

(56) References Cited

U.S. PATENT DOCUMENTS

| | | |
|---|---|---|
| 2008/0289736 A1 | 11/2008 | Adamson et al. |
| 2011/0175778 A1 | 7/2011 | Myatt |
| 2016/0236521 A1 | 8/2016 | Yukawa |
| 2016/0303921 A1 | 10/2016 | Miklic et al. |
| 2017/0225524 A1 | 8/2017 | Tamura |
| 2017/0274710 A1* | 9/2017 | Matsumoto ............. B60C 15/06 |

FOREIGN PATENT DOCUMENTS

| | | | |
|---|---|---|---|
| JP | 2007-049351 | | 2/2007 |
| JP | 2008-265750 | | 11/2008 |
| JP | 2012-086638 | | 5/2012 |
| JP | 2015-098198 | | 5/2015 |
| JP | 2016-037235 | | 3/2016 |
| JP | 2016-037236 | | 3/2016 |
| JP | 2016-539047 | | 12/2016 |
| WO | WO 03/105509 | * | 12/2003 |
| WO | WO 2016/035840 | * | 3/2016 |

OTHER PUBLICATIONS

IPRP issued in Application. No. PCT/JP2018/032660, dated Mar. 17, 2020, English translation.

* cited by examiner

PNEUMATIC TIRE

TECHNICAL FIELD

The present invention relates to a pneumatic tire in which an electronic component such as RFID is embedded.

BACKGROUND ART

In recent years, in order to monitor various data such as the internal pressure, temperature and rotational speed of pneumatic tire (hereinafter, also simply referred to as "tire") to improve safety, maintainability, etc. while the vehicle is traveling, it has been proposed that an electronic component such as transponder for RFID (Radio Frequency Identification) (hereinafter, also simply referred to as "RFID") for recording the data is to be attached to a tire.

The transponder is a small, lightweight electronic component consisting of a semiconductor chip with a transmitter/receiver circuit, a control circuit, a memory, etc., and an antenna. As the transponder, battery-less one is often used which can transmit various data in the memory as response radio waves when it receives an inquiry radio wave which is used as electrical energy.

As a method of attaching such an electronic component to a tire, a method has been proposed in which the electronic component is adhered to the surface of the tire after vulcanization by adhesion or the like (for example, Patent Document 1). However, when this method is adopted, there is a problem that the electronic component easily falls-off while traveling on the road surface, although there is little risk that the electronic component is destroyed.

Then, in order to prevent falling-off of the electronic component, a method has been proposed in which the electronic component is integrated with a tire by vulcanization adhesion accompanying vulcanization molding after embedding the electronic component in the inside of an unvulcanized tire (for example, Patent Document 2).

PRIOR ART DOCUMENTS

Patent Documents

[Patent document 1] JP2006-168473 A
[Patent document 2] JP2008-265750 A

SUMMARY OF INVENTION

Problem to be Solved by the Invention

However, when a method is adopted in which an electronic component is embedded in the inside of the unvulcanized tire and then integrated with the tire, there is a problem that the electronic component is easily destroyed by an impact load during traveling on the road surface, and that the durability of the tire is lowered due to the embedded hard electronic component, although there is no risk that the electronic component may fall off. Thus, further improvement is required.

Therefore, an object of the present invention is to provide a manufacturing technology for tire which is suppressed from being destroyed by an impact load or the like when traveling on a road surface and from deterioration in tire durability, even in the case of a tire having an electronic component embedded therein.

Means for Solving the Problem

The inventors of the present invention have earnestly studied for solving the problem, found that the problem can be solved by the invention described below, and completed the present invention.

The invention according to claim 1 is;
a pneumatic tire which has
a bead reinforcing layer which is provided outer side of the carcass of the bead portion in the tire axial direction and reinforces the bead portion from the outer side of the carcass;
a clinch member provided outer side of the bead reinforcing layer in the tire axial direction; and
an electronic component,
wherein the clinch member has a lower rigidity than the bead reinforcing layer, and the electronic component is embedded between the bead reinforcing layer and the clinch member.

The invention according to claim 2 is;
the pneumatic tire according to claim 1 wherein
the bead reinforcing layer and the clinch member are each made of a rubber composition; and
$E^*$ (1) of the bead reinforcing layer and $E^*$ (2) of the clinch member, at 70° C., satisfy the following formula.

$$E^*(1)-E^*(2) \geq 5 \text{ MPa}$$

The invention according to claim 3 is;
the pneumatic tire according to claim 2 wherein
$E^*$ (1) of the bead reinforcing layer and $E^*$ (2) of the clinch member, at 70° C., satisfy the following formula.

$$E^*(1)-E^*(2) \geq 20 \text{ MPa}$$

The invention according to claim 4 is;
the pneumatic tire according to claim 3 wherein
$E^*$ (1) of the bead reinforcing layer and $E^*$ (2) of the clinch member, at 70° C., satisfy the following formula.

$$E^*(1)-E^*(2) \geq 40 \text{ MPa}$$

The invention according to claim 5 is;
the pneumatic tire according to any one of claims 1-4 wherein
the bead reinforcing layer and the clinch member are each made of a rubber composition; and
tan δ (1) of the bead reinforcing layer and tan δ (2) of the clinch member, at 70° C., satisfy the following formula.

$$\tan \delta(1) + \tan \delta(2) \leq 0.4$$

The invention according to claim 6 is;
the pneumatic tire according to claim 5 wherein
tan δ (1) of the bead reinforcing layer and tan δ (2) of the clinch member, at 70° C., satisfy the following formula.

$$\tan \delta(1) + \tan \delta(2) \leq 0.32$$

The invention according to claim 7 is;
the pneumatic tire according to any one of claims 1-6 wherein
the electronic component is located in the outer side than the carcass in the tire axial direction in the cross-sectional view, and is embedded at a position of 20 to 80% from the bottom of bead core with respect to the distance from the position of the maximum tire width to the bottom of bead core in the equatorial direction.

Effect of the Invention

According to the present invention, a manufacturing technology for a tire is provided which can manufacture a tire suppressed from being destroyed by an impact load or the like when traveling on a road surface and not causing deterioration in tire durability, even when the tire has an electronic component embedded therein.

EMBODIMENT FOR CARRYING OUT THE INVENTION

Hereinafter, the present invention will be described based on embodiments.

[1] Background of the Present Invention

As a result of examinations for solving the above-mentioned problems, the present inventors have thought that destruction of the electronic component, which is harder than ordinary rubber, could be suppressed by disposing the electronic component adjacent to the bead apex which is small in deformation during normal traveling. However, in the case where the carcass ply has a structure where the bead apex is wound up by the carcass ply, there is a concern that bringing the electronic component adjacent to the bead apex will be a hindrance to the winding up. Therefore, the bead apex is made smaller, and instead, the bead reinforcing layer is disposed outer side of the end of the carcass ply to bring the electronic component close to the bead reinforcing layer, and the electronic component is provided between the bead reinforcing layer and the clinch portion.

As a result of further examinations, when disposing the electronic component between the bead reinforcing layer and the clinch portion, if the rubber material of the clinch portion is hard, an external impact is easily transmitted to the electronic component, and there is a possibility of resulting in damage to the electronic component To prevent the possibility, it was considered necessary to make the rigidity of the clinch portion lower than the rigidity of the bead reinforcing layer. As a result, it was considered that external impact is less likely to be transmitted to the electronic component, and the durability of the embedded electronic component is improved. Thus, the present invention was completed.

That is, in the tire according to the present invention, the clinch member has a lower rigidity than the bead reinforcing layer, and the electronic component is embedded between the bead reinforcing layer and the clinch member. As a result, destruction of the electronic component due to impact load or the like during traveling on the road surface is suppressed and a tire not causing deterioration in tire durability can be provided.

[2] Embodiment of the Present Invention

1. Tire Configuration (1) Overall Configuration

Figure 1:
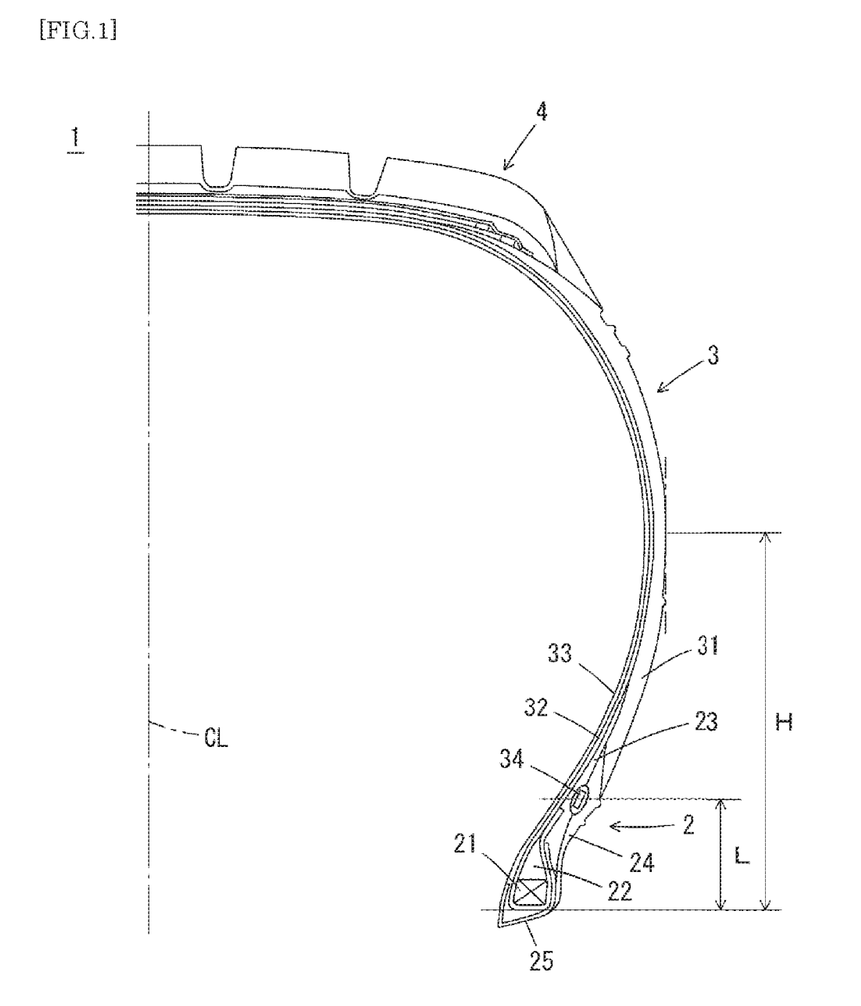
FIG. 1 This figure is a cross-sectional view showing a configuration of a pneumatic tire according to an embodiment of the present invention.

A tire according to the present embodiment has a bead reinforcing layer and an electronic component embedded in the tire. The tire according to the present embodiment will be described with reference to FIG. 1. FIG. 1 is a cross-sectional view showing the configuration of a tire according to an embodiment of the present invention, and more specifically, a cross-sectional view of a tire of size 235/75R15.

In FIG. 1, 1 is a tire, 2 is a bead portion, 3 is a sidewall portion, 4 is a tread, 21 is a bead core, 22 is a bead apex, 23 is a bead reinforcing layer, and 24 is a clinch member (hereinafter also referred to as "clinch"). In this case, the clinch is an external member located inside a sidewall in a tire radial direction, and located outside of a bead reinforcing layer in a tire axial direction. In addition, 25 is a chafer, 31 is a sidewall, 32 is a carcass ply, and 33 is an inner liner. And, 34 denotes an electronic component. In FIG. 1, H is the distance from the position of the maximum tire width to the bottom of bead core, and L is the distance of the electronic component 34 from the bottom of bead core.

(2) Configuration of Bead Portion

The bead reinforcing layer 23 is disposed outer side (right side in FIG. 1) of the carcass ply 32 of the bead portion 2 in the tire axial direction to suppress deformation of the bead apex. The tire axial direction is a direction parallel to the rotation axis of the tire. The tire axial direction outer side means the outer side in the axial direction with the plane passing through the tire equator CL as the center.

Further, a clinch 24 is disposed adjacent to the bead reinforcing layer 23 in the tire axial direction outer side, and the electronic component 34 is embedded between the bead reinforcing layer 23 and the clinch 24. The electronic component 34 does not have to be directly adjacent to the bead reinforcing layer 23 and the clinch 24, as far as it is provided between the bead reinforcing layer 23 and the clinch 24. For example, the electronic. component 34 may be coated with a rubber material other than the bead reinforcing layer 23 and the clinch 24.

(3) Rubber Properties of Bead Reinforcing Layer and Clinch (a) Rigidity of Bead Reinforcing Layer and Clinch In the tire according to the present embodiment, the clinch 24 has lower rigidity than the bead reinforcing layer 23. The rigidity of the rubber is usually expressed by E* (complex elastic modulus) or the like, and low rigidity means that the clinch 24 has a lower value of E* than the bead reinforcing layer 23. In the present application, E* means an absolute value.

When E* at 70° C. of bead reinforcing layer 23 and clinch 24 is expressed as E* (1) MPa and E* (2) MPa, respectively, it is preferable that (E* (1)–E* (2)) satisfies the following formula.

$$E^*(1)-E^*(2) \geq 5 \text{ MPa}$$

The right side of above formula is more preferably 20 MPa or more and further preferably 40 MPa or more.

There is no need to set the upper limit of the above formula in order to exert the effects of the present invention, but in view of easiness of manufacturing a tire, 80 MPa or less is preferable, and 75 MPa or less is more preferable.

In this case, E* in the above is the value measured under the conditions shown below using a visco-elastic spectrometer (for example, "VESF-3" manufactured by Iwamoto Seisakusho Ltd.) in accordance with the prescription of "JIS K 6394". E* (1) at 70° C., of the rubber composition for bead reinforcing layer is, for example, 10 to 130 MPa, and E* (2) at 70° C. of the rubber composition for clinch is, for example, 7 to 80 MPa.

Initial strain: 10%
Amplitude: ±2.0%
Frequency: 10 Hz
Deformation mode: Tension
Measurement temperature: 70° C.

And when using the rubber composition for bead reinforcing layers of E* (1) in the range exemplified above, the rubber composition for clinch of E* (2) which satisfies the above formula is used. Similarly, when using the rubber composition for clinch of E* (2) in the range exemplified above, the rubber composition for bead reinforcing layer of E* (1) which satisfies the above formula is used.

Thus, by making E* (2) of clinch 24 smaller than E* (1) of bead reinforcing layer23, in particular by appropriately controlling the difference as in the above formula, it is possible to reduce the impact on the electronic component and suppress the damage to the electronic component, in addition to maintaining the steering stability of the vehicle and suppressing the deterioration of the durability of the tire.

(B) Heat Generation Property of Bead Reinforcing Layer and Clinch

In the tire of the present embodiment, although peripheral members of the electronic component are hardly deformed and hardly generate heat, heat is still generated. If this heat generation is not suppressed, there is a risk that the temperature of the electronic component may be increased to damage it.

Therefore, in the present embodiment, when tan δ at 70° C. of the bead reinforcing layer 23 and the clinch 24 is expressed as tan δ (1) and tan δ (2), respectively, it is preferable that (tan δ (1)+tan δ (2)) satisfies the following formula.

$$\tan \delta(1) + \tan \delta(2) \leq 0.4$$

And the right side of above formula is more preferably 0.32 or less.

There is no need to set the lower limit of the above formula in order to exert the effects of the present invention, but in view of easiness of manufacturing the tire, 0.1 or more is more preferable, and 0.17 or more is further preferable.

In the above, tan δ is the value measured in accordance with the same manner as the measurement of E* described above. The tan δ (1) at 70° C. of the rubber composition for bead reinforcing layer is, for example, 0.02 to 0.25, and the tan δ (2) at 70° C. of the rubber composition for clinch is, for example, 0.02 to 0.29.

And when using the rubber composition for bead reinforcing layer of tan δ (1) in the range exemplified above, the rubber composition for clinch of tan δ (2) which satisfies the above-mentioned formula is used. Similarly, in the case of using the rubber composition for clinch of tan δ (2) in the range exemplified above, the rubber composition for bead reinforcing layer of tan δ (1) which satisfies the above formula is used.

Thus, by appropriately controlling the tan δ of the bead reinforcing layer 23 and the clinch 24, it is possible to suppress the increase in temperature around the electronic component, when both of the bead reinforcing layer 23 and the clinch 24 have low heat generation properties. In addition, even when one of them has low heat generation property, since the heat can be dissipated from the high side to the low side, it is possible to suppress the increase in temperature around the electronic component.

(4) Electronic Component

An electronic component is embedded in a tire according to the present embodiment. Specific examples of the electronic components include RFID, pressure sensor, temperature sensor, acceleration sensor, magnetic sensor, groove depth sensor, and the like. Above all, RFID is particularly preferred, since it can store and read a large capacity of information without contact, that is, it can store tire manufacturing information, management information, customer information, and the like in addition to data such as pressure and temperature.

In the present embodiment, the electronic component 34 is embedded between the bead reinforcing layer 23 and the clinch 24. As a result, compared to the case where the electronic component is disposed on the carcass side of the inner layer of tire, it is possible to suppress the occurrence of local stress concentration which becomes the fracture start point of the carcass. The specific embedding position is not particularly limited as far as reliable information communication is possible and the electronic component is not easily damaged by the deformation of the tire. As a position where the damage of the electronic component by the deformation of the tire is relatively small and communication from the outside can be made without problems when assembled in the rim, a position outer side of the end of carcass in tire axial direction where the height from the bottom of bead core (L in FIG. 1) is 20 to 80% with respect to the distance from the position of the maximum tire width to the bottom of bead core in the equatorial direction (H in FIG. 1) in the tire cross-sectional view is preferable.

The longitudinal size (overall length including the IC chip and the antenna) of the electronic component to be embedded in the present embodiment is preferably 18 cm or less, more preferably 9 cm or less, further more preferably 4 cm or less, and most preferably 2 cm or less. With such a small size, although stress may be concentrated on the surrounding rubber, the durability of the tire can be stably maintained, since consideration is given to local stress concentration in the present embodiment, as described above. At this time, bending of the antenna portion can be kept to a minimum by arranging the antenna portion of the electronic component to extend in an orthogonal direction to the cord of carcass.

(5) Rubber Composition (a) Rubber Composition of Bead Reinforcing Layer

In the present embodiment, the rubber composition used for producing the bead reinforcing layer can be obtained by kneading a rubber component and a curable resin, as main components, and various compounding materials, such as a reinforcing material, an anti-aging agent and an additive.

(i) Rubber Component

As the rubber component, for example, diene rubbers such as natural rubber (NR), isoprene rubber (IR), butadiene rubber (BR), styrene butadiene rubber (SBR), acrylonitrile butadiene rubber (NBR), chloroprene rubber (CR), butyl rubber (IIR), and the like can be mentioned. Among them, isoprene-based rubbers (NR and IR) are preferable from the viewpoint that steering stability, low fuel consumption and extrusion processability can be favorably improved.

Content of the isoprene-based rubber (NR or IR) is preferably 50 parts mass or more, and more preferably 60 parts by mass or more in 100 parts by mass of the rubber component. By setting the content of isoprene-based rubber (NR and IR) as described above, sufficient breaking strength and sufficient hardness can be secured.

(ii) Curable Resin

It is preferable that a curable resin is compounded in the rubber composition of the bead reinforcing layer for enhancing the rigidity. As the curable resin, a phenol-type resin can be mentioned although it is not specifically limited.

Specific examples of the phenol-type resins include phenolic resins and modified phenolic resins. Here, the phenolic resin is obtained by reacting phenol with an aldehyde such as formaldehyde, acetaldehyde, furfural or the like by an acid or an alkali catalyst. The modified phenolic resin is a phenolic resin modified with a compound such as cashew oil, tall oil, linseed oil, various animal and vegetable oils, unsaturated fatty acids, rosins, alkylbenzene resins, aniline and melamine.

As the phenol resin, a modified phenol resin is preferable, and a cashew oil modified phenol resin and a rosin modified phenol resin are more preferable from the viewpoint that a good hardness can be obtained by a curing reaction.

Content of the curable resin in the rubber composition is preferably 5 parts by mass or more, and more preferably 10 parts by mass or more with respect to 100 parts by mass of the rubber component. Moreover, it is preferably 25 parts by mass or less, and more preferably 20 parts by mass or less. By setting the content of the curable resin within the above range, sufficient rigidity and steering stability can be secured.

In the case of compounding a phenolic resin as a curable resin, it is preferable to further contain a curing agent having a curing action with the phenolic resin. The specific curing agent is not particularly limited as far as it has the above-mentioned curing action, and, for example, hexamethylenetetramine (HMT), hexamethoxymethylolmelamine (HMMM), hexamethoxymethylol pantamethylether (HMMPME), melamine, methylolmelamine and the like can be mentioned. Among them, HMT, HMMM, and HMMPME are preferable from the viewpoint of being excellent in the action of increasing the hardness of the phenolic resin.

Content of the curing agent is preferably 1 part by mass or more, and more preferably 5 parts by mass or more with respect to 100 parts by mass of the phenolic resin. If the amount is less than 1 part by mass, sufficient curing may not be possible. Moreover, it is preferably 20 parts by mass or less, and more preferably 15 parts by mass or less. If it exceeds 20 parts by mass, the curing may be uneven, and scorch may occur during extrusion.

Carbon Black

It is preferable that carbon black is compounded as a reinforcing material in the rubber composition of the present embodiment. Examples of carbon black include GPF, HAF, ISAF, SAF, FF, FEF and the like. One of these carbon blacks may be used alone, or two or more thereof may be used in combination. Among these, hard carbon-based ISAF, SAF and HAF are preferable from the viewpoint of securing the hardness. Among them, HAF is particularly preferable.

Content of carbon black in the above rubber composition is preferably 30 parts by mass or more, and more preferably 45 parts by mass or more with respect to 100 parts by mass of the rubber component. Moreover, it is preferably 70 parts by mass or less, and more preferably 65 parts by mass or less. By setting the content of carbon black in the rubber composition within the above range, sufficient fracture characteristics can be obtained.

(iv) Vulcanizing Agent and Vulcanization Accelerator

Sulfur is used as a vulcanizing agent, and its content is preferably 1 part by mass or more, and more preferably 2 parts by mass or more with respect to 100 parts by mass of the rubber component. Moreover, it is preferably 8 parts by mass or less, and more preferably 6 parts by mass or less. By setting the content of sulfur within the above range, sufficient steering stability can be secured, the bloom and adhesion of sulfur can be suppressed, and the durability can be secured. Content of sulfur is pure sulfur content, and when using insoluble sulfur, it is content except oil content.

Sulfur is usually used together with a vulcanization accelerator. Content of the vulcanization accelerator is preferably 1.5 parts by mass or more, and more preferably 2.0 parts by mass or more with respect to 100 parts by mass of the rubber component. Moreover, it is preferably 5.0 parts by mass or less, and more preferably 4.0 parts by mass or less. By setting the content of the vulcanization accelerator within the above range, the effects of the present invention tend to be favorably obtained. As specific examples of the vulcanization accelerators, sulfenamide type, thiazole type, thiuram type, thiourea type, guanidine type, dithiocarbamic acid type, aldehyde-amine type or aldehyde-ammonia type, imidazoline type, and xanthate type vulcanization accelerators can be mentioned. These vulcanization accelerators may be used alone or in combination of two or more. Among these, sulfenamide type vulcanization accelerators are preferred because the scorch time and the vulcanization time can be balanced.

(v) Stearic Acid

As stearic acid, conventionally known products can be used. For example, products manufactured by NOF Corporation, Kao Corporation, Wako Pure Chemical Industries, Ltd., Chiba Fatty Acid Corporation, etc. can be used. When stearic acid is used, content of stearic acid is preferably 0.5 part by mass or more, and more preferably 1 part by mass or more with respect to 100 parts by mass of the rubber component. Moreover, it is preferably 10 parts by mass or less, and more preferably 5 parts by mass or less. By setting the content of stearic acid within the above range, the effects of the present invention tend to be obtained favorably.

(vi) Zinc Oxide

As zinc oxide, conventionally known ones can be used. For example, products manufactured by Mitsui Mining & Smelting Co., Ltd., Toho Zinc Co., Ltd., Hakusui Tech Co. Ltd., Shodo Chemical Industry Co., Ltd., Sakai Chemical Industry Co., Ltd., etc. can be used. When using zinc oxide, content of zinc oxide is preferably 0.5 part by mass or more, and more preferably 1 part by mass or more with respect to 100 parts by mass of the rubber component. Moreover, it is preferably 10 parts by mass or less, and more preferably 5 parts by mass or less. By setting the content of zinc oxide within the above range, the effects of the present invention tend to be obtained favorably.

(vii) Anti-Aging Agent

As the anti-aging agent, an amine-type anti-aging agent having an excellent ozone resistance effect is preferable. The amine-type anti-aging agent is not particularly limited, and examples thereof include amine derivatives such as diphenylamine-type, p-phenylenediamine-type, naphthylamine-type and ketone amine condensate-type ones. These may be used alone, and two or more may be used in combination. Examples of diphenylamine type derivatives include p-(p-toluenesulfonylamide)-diphenylamine, octylated diphenylamine, 4,4'-bis($\alpha,\alpha'$-dimethylbenzyl) diphenylamine and the like. Examples of p-phenylenediamine type derivatives include N-(1,3-dimethylbutyl)-N'-phenyl-p-phenylenediamine (6PPD), N-phenyl-N'-isopropyl-p-phenylenediamine (IPPD) and N,N'-di-2-naphthyl-p-phenylenediamine. Examples of the naphthylamine type derivatives include phenyl-$\alpha$-naphthylamine and the like. Among them, phenylenediamine type and ketone amine condensate type are preferable. Content of the anti-aging agent is preferably 0.3 part by mass or more, and more preferably 0.5 part by mass or more with respect to 100 parts by mass of the rubber component. Moreover, it is preferably 8 parts by mass or less, and more preferably 2.5 parts by mass or less.

(viii) Wax

Waxes are not particularly limited, and petroleum waxes such as paraffin wax and microcrystalline wax; natural waxes such as plant wax and animal waxes; synthetic waxes such as polymers of ethylene and propylene etc. can be mentioned as the examples. These may be used alone or in combination of two or more. As specific examples of wax, products manufactured by Ouchi Shinko Chemical Co., Ltd., Nippon Seiro Co., Ltd., Seiko Kagaku Co., Ltd., etc. can be used. When a wax is used, content of the wax is preferably 0.5 part by mass or more, and more preferably 1 part by mass or more with respect to 100 parts by mass of the rubber component. Moreover, it is preferably 10 parts by mass or less, and more preferably 7 parts by mass or less.

(ix) Oil

Examples of oils include process oils, vegetable oils and fats, and mixtures thereof. As the process oil, for example, paraffin-based process oil, aroma-based process oil, naphthene-based process oil and the like can be used. Examples of vegetable fats and oils include castor oil, cottonseed oil, linseed oil, rapeseed oil, soybean oil, palm oil, coconut oil, peanut oil, rosin, pine oil, pine tar, tall oil, corn oil, rice oil, beni flower oil, sesame oil, olive oil, sunflower oil, palm kernel oil, camellia oil, jojoba oil, macadamia nut oil and tung oil. These may be used alone or in combination of two or more. Specific examples of the oil which can be used include products manufactured by Idemitsu Kosan Co., Sankyo Yuka Kogyo Co., Ltd., Japan Energy Co., Ltd., Orisoi Company, H & R Company, Toyokuni Oil Co., Ltd., Showa Shell Co., Ltd., Fuji Kosan Co., Ltd., etc. Content of oil is preferably 0.5 part by mass or more, and more preferably 1 part by mass or more with respect to 100 parts by mass of the rubber component. Moreover, it is preferably 10 parts by mass or less, and more preferably 5 parts by mass or less.

(x) Others

In addition to the above components, the rubber composition of the present embodiment may also contain compounding materials conventionally used in the rubber industry. For example, inorganic fillers such as silica, talc and calcium carbonate, and organic fillers such as cellulose fibers, softeners such as liquid rubber and adhesive resins, vulcanizing agents other than sulfur, organic crosslinking agents, and the like may be compounded as needed. About the compounding quantity of each compounding material, it can be selected suitably.

As described above, the bead reinforcing layer is preferably adjusted so that $E^*$ and $\tan \delta$ satisfy the predetermined formulas with respect to the clinch. As an adjustment method of $E^*$ of a bead reinforcing layer, adjustment by increase or decrease of curable resin can be mentioned. As shown in Examples described later, $E^*$ can be increased by increasing the amount of the curable resin. Also, $E^*$ can be adjusted by increase or decrease of the carbon black and the sulfur content. As shown in Examples described later, $E^*$ can be increased by increasing carbon black and sulfur. However, when the amount of carbon black is increased, $\tan \delta$ is increased, and when the amount of sulfur is increased, $\tan \delta$ is decreased. Therefore, it is preferable to adopt a method where use of the curable resin and use amount of it is determined first, then the amount of sulfur is adjusted and thereafter the amount of carbon black is adjusted finally. This method allows the aimed $E^*$ and $\tan \delta$ can be achieved without the need for excessive trial and error.

(b) Rubber Composition of Clinch

The rubber composition of the clinch 24 is basically the same as the rubber composition used for the bead reinforcing layer 23, but the rubber composition of the clinch 24 is adjusted to have the rigidity lower than that of the rubber composition of the bead reinforcing layer. In the present embodiment, it is possible to adjust the compounding amount of the materials while using the same materials other than the rubber component. Therefore, a rubber component in the above embodiment will be described below.

Basically, the same rubber component as that of the bead reinforcing layer can be used. For example, combined use of isoprene-based rubber (NR or IR) and BR is more preferred, because good fuel consumption and durability can be obtained.

Content of the isoprene-based rubber (NR or IR) is preferably 10 parts by mass or more, and more preferably 30 parts by mass or more in 100 parts by mass of the rubber component. Moreover, it is preferably 80 parts by mass or less, and more preferably 50 parts by mass or less. By setting the content of isoprene-based rubber (NR or IR) in the rubber component within the above range, sufficient breaking elongation and sufficient bending crack growth resistance can be secured.

Content of the BR is preferably 20 parts by mass or more, and more preferably 50 parts by mass or more in 100 parts by mass of the rubber component. Moreover, it is preferably 90 parts by mass or less, and more preferably 70 parts by mass or less. By setting the content of BR in the rubber component within the above range, sufficient bending crack growth resistance and sufficient breaking strength can be secured.

The BR is not particularly limited. For example, BR having a high cis content, BR containing syndiotactic polybutadiene crystals (SPB-containing BR), modified BR and the like can be used. Among them, SPB-containing BR is preferable from the viewpoint that extrusion processability can be greatly improved by the intrinsic orientation crystal component.

In the combined use of isoprene-based rubber (NR or IR) and BR, total content of isoprene rubber (NR or IR) and BR is preferably 80 parts by mass or more, and more preferably 90 parts by mass or more in 100 parts by mass of the rubber component. By setting the total content of isoprene-based rubber (NR and IR) and BR within the above range, sufficient low fuel consumption and sufficient durability can be secured.

As described above, the clinch is configured to be low in rigidity with respect to the bead reinforcing layer, and preferably adjusted so that $E^*$ and $\tan \delta$ satisfy the predetermined relational formulas. The adjustment method of clinch $E^*$ may be the same adjustment method as that in the bead reinforcing layer, but it is preferable to adjust it by the amount of carbon black or sulfur without using the curable resin as much as possible. That is, it is preferable to adjust the amount of sulfur first, then adjust the amount of carbon black, and finally adjust the amount of curable resin. This allows the aimed $E^*$ and $\tan \delta$ can be achieved without the need for excessive trial and error.

(c) Manufacturing Method of Rubber Composition

The rubber compositions of the bead reinforcing layer and the clinch can be manufactured by a known method, for example, by a method of kneading the above-mentioned components using a rubber kneading apparatus such as an open roll or a banbury mixer.

2. Manufacture of Tire

The tire according to the present embodiment can be manufactured by a usual method except for embedding an electronic component in the middle of molding. That is, the bead reinforcing layer 23 and the clinch 24 are molded by extrusion processing according to the shape of the bead apex at the unvulcanized stage of the rubber composition, and pasted together with the other tire members on a tire forming machine according to the usual method and an unvulcanized tire is formed. In the middle of molding, the electronic component is embedded at a predetermined position between the bead reinforcing layer and the clinch.

Thereafter, a tire is manufactured by heating and pressing the molded unvulcanized tire in which an electronic component is embedded in a vuicanizer.

EXAMPLES

1. Compounding Materials and Formulation

Table 1 shows the compounding materials. Table 2 and Table 3 show the formulation.

TABLE 1

| Compounding materials | Product Name | Manufacturer |
|---|---|---|
| (Rubber component) | | |
| NR | TSR20 | |
| BR | UBEPOL BR 150B | Ube Industries, Ltd. |
| (Reinforcing material) | | |
| Carbon Black | N330 | Showa Cabot Co., Ltd. |
| (Curable resin · Curing agent) | | |
| Curable resin | PR 12686 | Sumitomo Bakelite Co., Ltd. |
| Curing agent 1 | SUMIKANOL 507AP | Taoka Chemical Co., Ltd. |
| Curing agent 2 | SANCELER HMT | Sanshin Chemical Industry Co., Ltd. |
| (Softener) | | |
| Oil | Diana Process AH-24 | Idemitsu Kosan Co., Ltd. |
| (Anti-aging agent) | | |
| Anti-aging agent 1 | NOCLAC 6C | Ouchi Shinko Chemical Co., Ltd |
| Anti-aging agent 2 | NOCLAC RD | Ouchi Shinko Chemical Co., Ltd. |
| (Vulcanizing agent) | | |
| Sulfur | Insoluble Sulfur | Tsurumi Chemical Industry Co., Ltd. |
| Vulcanization accelerator | SANCELER NS-G | Sanshin Chemical Industry Co., Ltd. |
| (Others) | | |
| Stearic acid | Camellia oil | NOF CORPORATION |
| Zinc oxide | Zinc Flower 1 | Mitsui Mining & Smelting Co., Ltd. |
| Wax | SANNOC N | Ouchi Shinko Chemical Co., Ltd. |

TABLE 2

| | Formulation | | | | | |
|---|---|---|---|---|---|---|
| | 1 | 2 | 3 | 4 | 5 | 6 |
| NR | 100 | 100 | 100 | 100 | 100 | 100 |
| Carbon Black | 60 | 80 | 60 | 50 | 50 | 80 |
| Curable resin | 13 | 20 | 7 | 22 | 20 | 15 |
| Zinc oxide | 4 | 4 | 4 | 4 | 4 | 4 |
| Stearic acid | 2 | 2 | 2 | 2 | 2 | 2 |
| Oil | 2 | 2 | 2 | 2 | 2 | 2 |
| Anti-aging agent 1 | 1 | 1 | 1 | 1 | 1 | 1 |
| Sulfur | 3 | 3 | 3 | 3 | 4.5 | 3 |
| Vulcanization accelerator | 2.5 | 2.5 | 2.5 | 2.5 | 3 | 2.5 |
| Curing agent 1 | 0.5 | 0.5 | 0.5 | 0.5 | 0.5 | 0.5 |
| Curing agent 2 | 1.3 | 2 | 0.7 | 2.2 | 2.2 | 2 |
| E* | 50 | 90 | 35 | 85 | 100 | 80 |
| tan δ | 0.18 | 0.2 | 0.18 | 0.13 | 0.06 | 0.22 |

TABLE 3

| | Formulation | | | | | |
|---|---|---|---|---|---|---|
| | a | b | c | d | e | f |
| NR | 40 | 40 | 40 | 40 | 40 | 40 |
| BR | 60 | 60 | 60 | 60 | 60 | 60 |
| Carbon Black | 65 | 45 | 50 | 55 | 50 | 70 |
| Curable resin | — | — | 15 | — | — | 7 |
| Zinc oxide | 3 | 3 | 3 | 3 | 3 | 3 |
| Stearic acid | 2 | 2 | 2 | 2 | 2 | 2 |
| Oil | 2 | 2 | 2 | 2 | 2 | 2 |
| Wax | 1.5 | 1.5 | 1.5 | 1.5 | 1.5 | 1.5 |
| Anti-aging agent 1 | 1.5 | 1.5 | 1.5 | 1.5 | 1.5 | 1.5 |
| Anti-aging agent 2 | 1 | 1 | 1 | 1 | 1 | 1 |
| Sulfur | 2.5 | 2.5 | 2.5 | 3 | 6 | 2.5 |
| Vulcanization accelerator | 3.2 | 3.2 | 3.2 | 3.2 | 3.2 | 3.2 |
| Curing agent 1 | — | — | 0.5 | — | — | — |
| Curing agent 2 | — | — | 1.5 | — | — | 0.7 |
| E* | 15 | 10 | 70 | 10 | 30 | 50 |
| tan δ | 0.15 | 0.09 | 0.12 | 0.12 | 0.04 | 0.18 |

2. Preparation of Pneumatic Tire

Based on the formulations in Table 1 and Table 2, using a banbury mixer manufactured by Kobe Steel, Ltd., compounding materials other than sulfur and a vulcanization accelerator are kneaded, then sulfur and a vulcanization accelerator are added to the kneaded product thus obtained, followed by kneading using an open roll, and an unvulcanized rubber composition for a bead reinforcing layer can be obtained.

Moreover, based on the formulations in Table 1 and Table 3, an unvulcanized rubber composition for clinch can be obtained. Moreover, according to Example 1 in JP2013-245339A, the rubber composition for coating electronic component 34 can be obtained.

Then, the obtained unvulcanized rubber composition is molded into the shape of a bead reinforcing layer or a clinch, respectively, and the unvulcanized rubber composition is laminated and pasted together with other tire members on a tire molding machine. A test tire (tire size: 195/65R15) can be obtained by placing the electronic component 34 coated with an unvulcanized rubber composition on a position shown in any of FIGS. 2A to 2E described later and carrying out the vulcanization at 150° C. for 30 minutes. As the electronic component 34, an RFID in which a 30 mm antenna is provided on both sides of a 3 mm×3 mm×0.4 mm IC chip can be used.

The physical properties (E* and tan δ) in each of the formulations shown in Table 2 and Table 3 above are measured by the following methods.

That is, a rubber sample is extracted from each of the bead reinforcing layer and the clinch member of each pneumatic tire, and E* and tan δ are measured using a viscoelastic spectrometer ("VESF-3" manufactured by Iwamoto Manufacturing Co., Ltd.) under the following conditions.

Initial strain: 10%
Amplitude: ±2.0%
Frequency: 10 Hz
Deformation mode: Tension
Measurement temperature: 70° C.

Figure 2A:
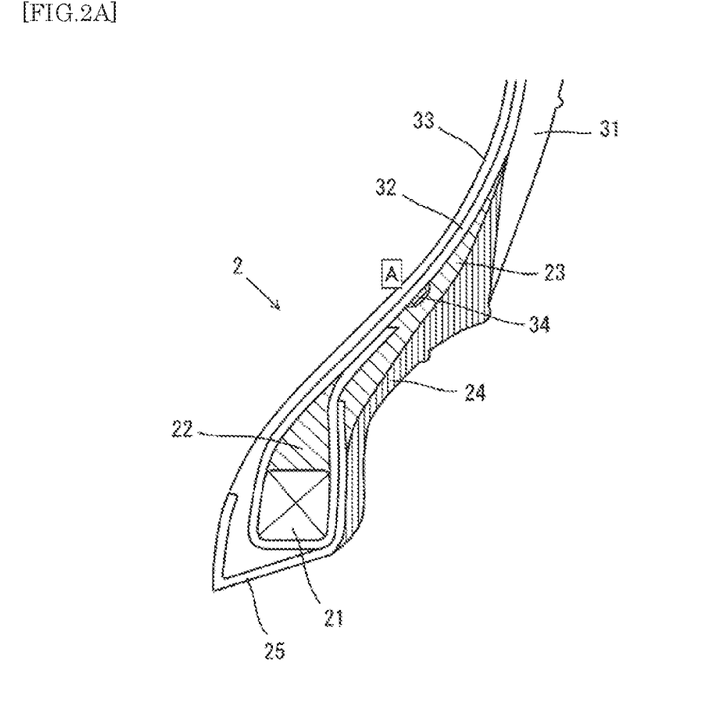
FIG. 2A It is a figure explaining the disposed position of the electronic component in an Example of this invention.
Figure 2B:
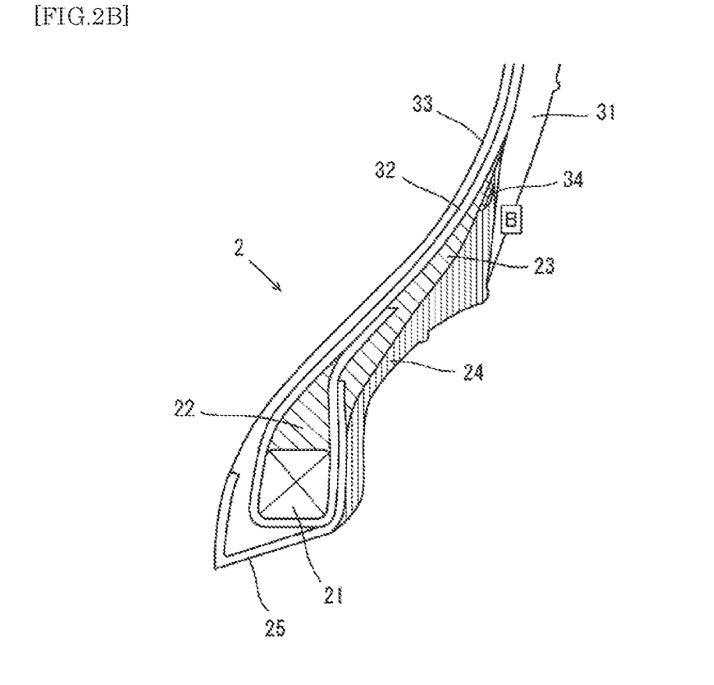
FIG. 2B It is a figure explaining the disposed position of the electronic component in an Example of this invention.
Figure 2C:
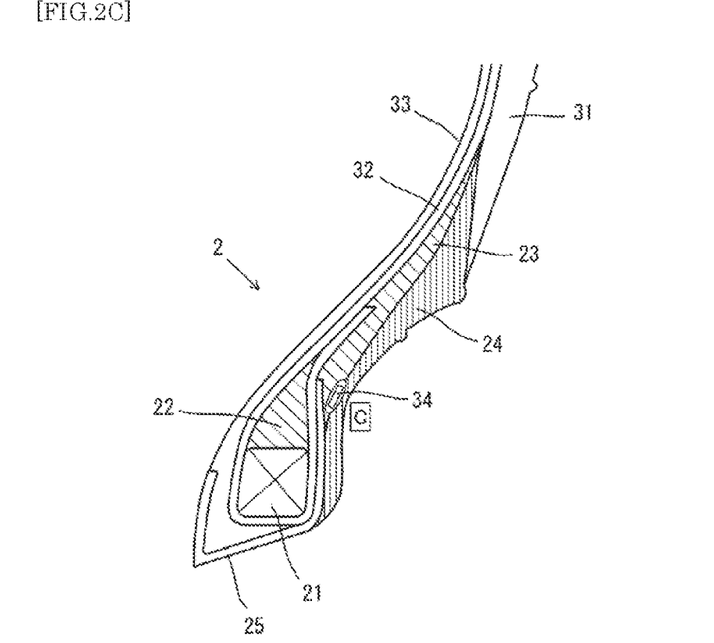
FIG. 2C It is a figure explaining the disposed position of the electronic component in an Example of this invention.
Figure 2D:
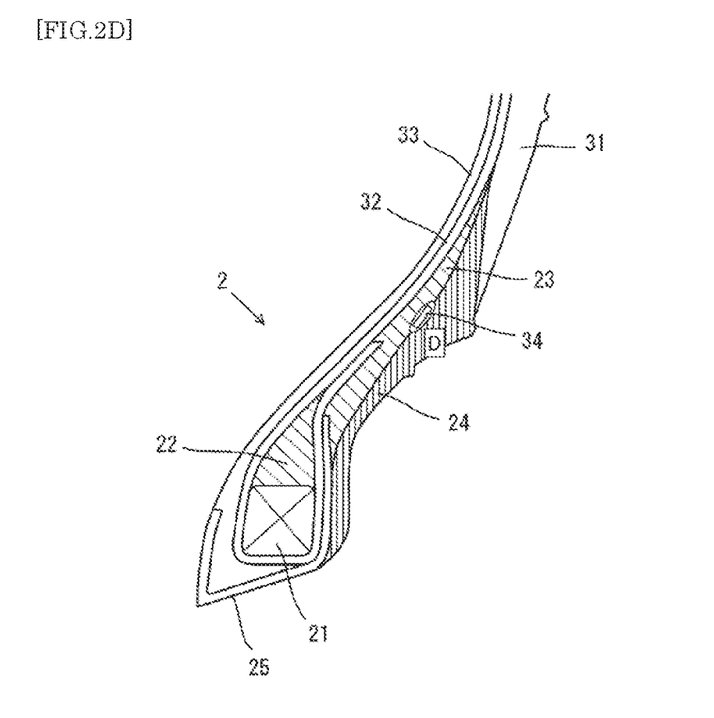
FIG. 2D It is a figure explaining the disposed position of the electronic component in an Example of this invention.
Figure 2E:
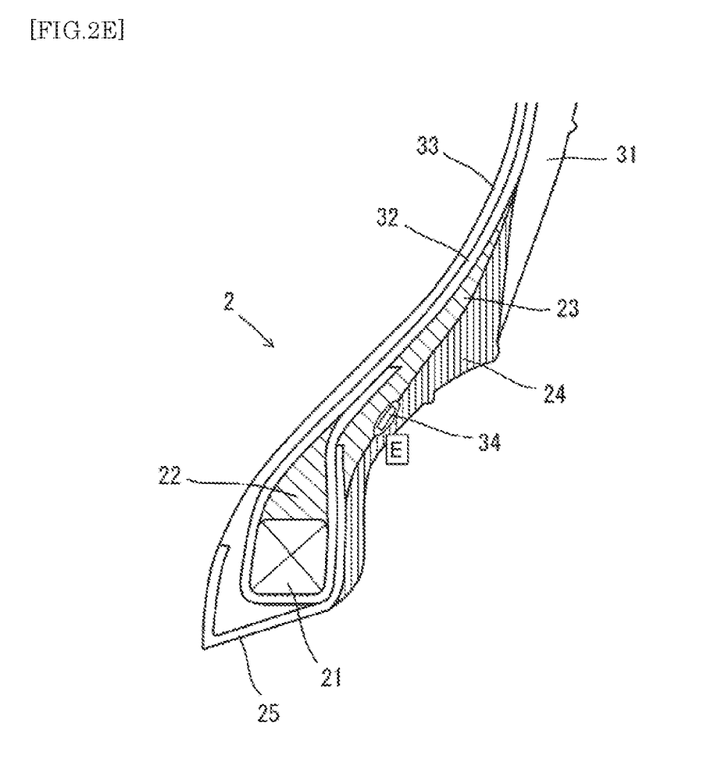
FIG. 2E It is a figure explaining the disposed position of the electronic component in an Example of this invention.

Specific insertion positions of the electronic component 34 are shown in FIGS. 2A to 2E. In FIG. 2A, the electronic component 34 is provided at a position 31% from the bottom of bead core, in FIG. 2B, the electronic component 34 is provided at a position 40% from the bottom of the bead core, and in FIG. 2C, the electronic component 34 is provided at a position 12% from the bottom of bead core, in FIG. 2D, the electronic component 34 is provided at a position 29% from the bottom of bead core, and in FIG. 2E, the electronic component 34 is provided at a position 21% from the bottom of the bead core. These values for the positions are values with respect to the distance from the position of the maximum tire width to the bottom of bead core.

Tables 4 to 7 show the relationship between the formulation and physical properties of the bead reinforcing layer and the clinch, the position of the electronic component, the durability of the tire, and the communication performance of the electronic component.

The durability of the tire is evaluated as "Y"(acceptable) if it is possible to drive 10,000 km on a general road, and if it is not possible, evaluated as "NG"(not acceptable). Regarding the driving conditions, the mounting rim is 15×6.5 J, the tire internal pressure is 230 kPa, the test vehicle is a front wheel drive vehicle, the displacement is 2000 cc, and the tire mounting position is all wheels.

Figure 3:
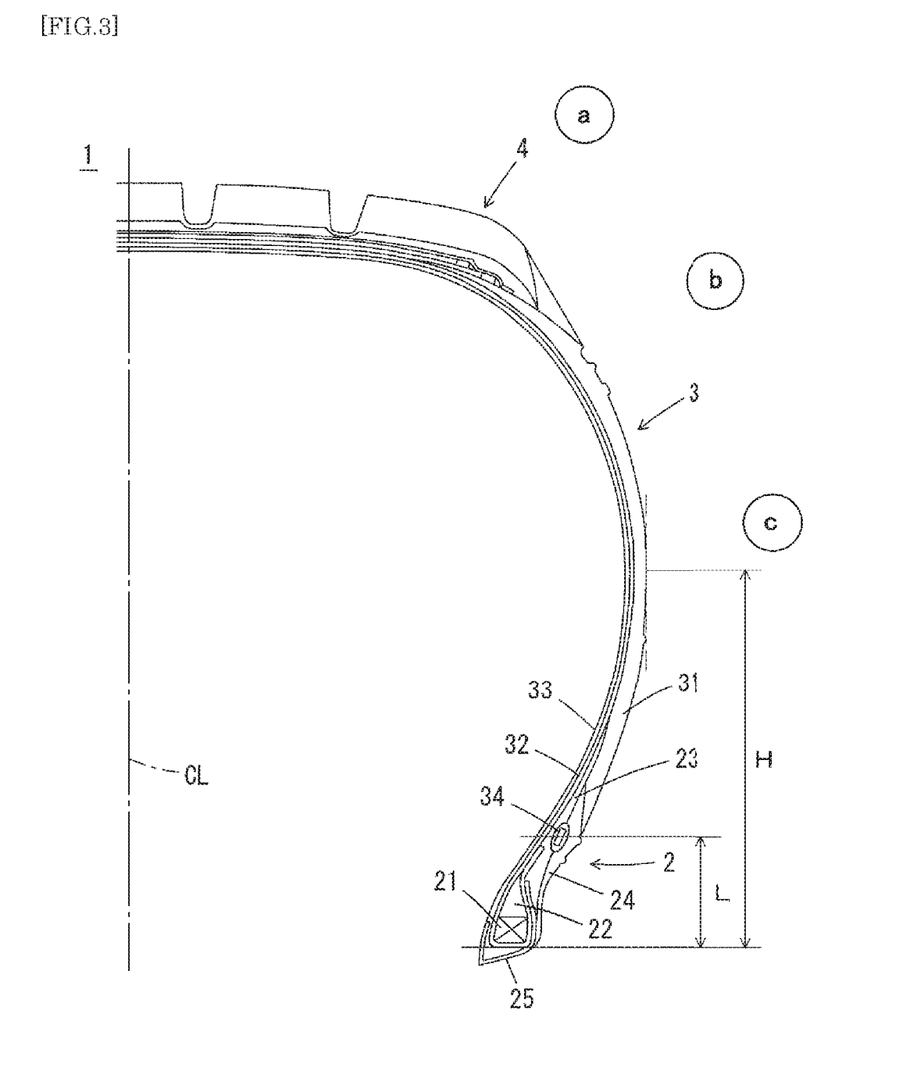
FIG. 3 It is a figure explaining the communication measurement points in the Examples of the present invention.

The evaluation method of communication property is a method where transceivers for the electronic component are installed at three measurement points (a to c) of the circle shown in FIG. 3 and it is judged whether communication of data with the electronic component is possible.

Specifically, the tire is assembled in a rim and mounted in a vehicle for conducting the measurement, and the ratio of (the number of readable positions after the durability evaluation/the number of readable positions before the durability evaluation) is calculated. The evaluation result is "EX" (excellent), if the average value of the four tire is 60% or more; "G"(good), if 50% or more and less than 60%; "Y"(acceptable), if more than 0% and less than 50%; and "NG"(not acceptable), if 0% or readable position before durability evaluation is 0.

TABLE 4

| | | Examples/Comparative examples | | | | | |
|---|---|---|---|---|---|---|---|
| | | Example 1 | Example 2 | Compar. example 1 | Compar. example 2 | Compar. example 3 | Compar. example 4 |
| Formulation | bead reinforcing layer | 1 | 1 | 1 | 1 | 1 | 1 |
| | clinch member | b | e | f | c | b | e |
| insertion position of electronic component | | D | D | D | D | A | A |
| E* | bead reinforcing layer | 50 | 50 | 50 | 50 | 50 | 50 |
| | clinch member | 10 | 30 | 50 | 70 | 10 | 30 |
| | difference | 40 | 20 | 0 | −20 | 40 | 20 |
| tan δ | bead reinforcing layer | 0.18 | 0.18 | 0.18 | 0.18 | 0.18 | 0.18 |
| | clinch member | 0.09 | 0.04 | 0.18 | 0.12 | 0.09 | 0.04 |
| | sum | 0.27 | 0.22 | 0.36 | 0.30 | 0.27 | 0.22 |
| durability of tire | | Y | Y | Y | Y | Y | Y |
| communication performance of electronic component | | EX | G | NG | NG | NG | NG |

TABLE 5

| | | Examples/Comparative examples | | | | | |
|---|---|---|---|---|---|---|---|
| | | Example 3 | Example 4 | Compar. Example 5 | Example 5 | Example 6 | Example 7 |
| Formulation | bead reinforcing layer | 3 | 3 | 3 | 4 | 4 | 4 |
| | clinch member | b | e | f | b | e | f |
| insertion position of electronic component | | D | D | D | D | D | D |
| E* | bead reinforcing layer | 35 | 35 | 35 | 85 | 85 | 85 |
| | clinch member | 10 | 30 | 50 | 10 | 30 | 50 |
| | difference | 25 | 5 | −15 | 75 | 55 | 35 |

TABLE 5-continued

| | | Examples/Comparative examples | | | | | |
|---|---|---|---|---|---|---|---|
| | | Example 3 | Example 4 | Compar. Example 5 | Example 5 | Example 6 | Example 7 |
| tan δ | bead reinforcing layer | 0.18 | 0.18 | 0.18 | 0.13 | 0.13 | 0.13 |
| | clinch member | 0.09 | 0.04 | 0.18 | 0.09 | 0.04 | 0.18 |
| | sum | 0.27 | 0.22 | 0.36 | 0.22 | 0.17 | 0.31 |
| durability of tire | | Y | Y | Y | Y | Y | Y |
| communication performance of electronic component | | G | Y | NG | EX | EX | G |

TABLE 6

| | | Examples/Comparative examples | | |
|---|---|---|---|---|
| | | Example 8 | Example 9 | Example 10 |
| Formulation | bead reinforcing layer | 5 | 2 | 6 |
| | clinch member | e | d | f |
| insertion position of electronic component | | D | D | D |
| E* | bead reinforcing layer | 100 | 90 | 80 |
| | clinch member | 30 | 10 | 50 |
| | difference | 70 | 80 | 30 |
| tan δ | bead reinforcing layer | 0.06 | 0.2 | 0.22 |
| | clinch member | 0.04 | 0.12 | 0.18 |
| | sum | 0.1 | 0.32 | 0.4 |
| durability of tire | | Y | Y | Y |
| communication performance of electronic component | | EX | EX | G |

TABLE 7

| | | Examples/Comparative examples | | | |
|---|---|---|---|---|---|
| | | Comparative Example 6 | Example 11 | Example 12 | Example 13 |
| Formulation | bead reinforcing layer | 4 | 4 | 4 | 4 |
| | clinch member | b | b | b | b |
| insertion position of electronic component | | A | B | C | E |
| E* | bead reinforcing layer | 85 | 85 | 85 | 85 |
| | clinch member | 10 | 10 | 10 | 10 |
| | difference | 75 | 75 | 75 | 75 |
| tan δ | bead reinforcing layer | 0.13 | 0.13 | 0.13 | 0.13 |
| | clinch member | 0.09 | 0.09 | 0.09 | 0.09 |
| | sum | 0.22 | 0.22 | 0.22 | 0.22 |
| durability of tire | | NG | Y | Y | Y |
| communication performance of electronic component | | — | G | Y | G |

As mentioned above, although the present invention was explained based on embodiments, the present invention is not limited to the above-mentioned embodiments. Various modifications can be made to the above embodiments within the same and equivalent scope of the present invention.

DESCRIPTION OF THE REFERENCE SIGNS 1 tire
2 bead portion
3 side wall portion
4 tread
21 bead core
22 bead apex
23 bead reinforcing layer
24 clinch
25 chaffer
31 side wall
32 carcass ply
33 inner liner
34 electronic component
CL tire equator
H Distance from the position of the maximum tire width to the bottom of bead core
L Distance from bottom of bead core of electronic component

What is claimed is:
1. A pneumatic tire comprising:
a bead reinforcing layer which is provided outer side of the carcass of the bead portion in the tire axial direction and reinforces the bead portion from the outer side of the carcass;
a clinch member provided outer side of the bead reinforcing layer in the tire axial direction; and
an electronic component,
wherein the clinch member has a lower rigidity than the bead reinforcing layer,
the electronic component is embedded between the bead reinforcing layer and the clinch, and wherein the electronic component does not include an insulating coating surrounding the electronic component,
$E^*$ (1) of the bead reinforcing layer and $E^*$ (2) of the clinch member, at 70° C., satisfy the following two formulas:

$$E^*(1) - E^*(2) \geq 5 \text{ MPa}$$

$$E^*(1) - E^*(2) \leq 80 \text{ MPa, and}$$

tan δ (1) of the bead reinforcing layer and tan δ (2) of the clinch member, at 70° C., satisfy the following two formula:

$$\tan \delta(1) + \tan \delta(2) \leq 0.4$$

$$\tan \delta(1) + \tan \delta(2) \geq 0.1.$$

2. The pneumatic tire according to claim 1, wherein $E^*$ (1) of the bead reinforcing layer and $E^*(2)$ of the clinch, at 70° C., satisfy the following formula:

$$E^*(1)-E^*(2) \geq 20 \text{ MPa.}$$

3. The pneumatic tire according to claim 2, wherein $E^*$ (1) of the bead reinforcing layer and $E^*$ (2) of the clinch member, at 70° C., satisfy the following formula:

$$E^*(1)-E^*(2) \geq 40 \text{ MPa.}$$

4. The pneumatic tire according to claim 1, wherein $E^*$ (1) of the bead reinforcing layer and $E^*$ (2) of the clinch member, at 70° C., satisfy the following formula:

$$E^*(1)-E^*(2) \leq 75 \text{ MPa.}$$

5. The pneumatic tire according to claim 1, wherein tan δ (1) of the bead reinforcing layer and tan δ (2) of the clinch member, at 70° C., satisfy the following formula:

$$\tan \delta(1)+\tan \delta(2) \leq 0.32.$$

6. The pneumatic tire according to claim 1, wherein tan δ (1) of the bead reinforcing layer and tan δ (2) of the clinch member, at 70° C., satisfy the following formula:

$$\tan \delta(1)+\tan \delta(2) \geq 0.17.$$

7. The pneumatic tire according to claim 1, wherein the electronic component is located outer side of the carcass in the tire axial direction in a cross-sectional view, and is embedded at a position of 20 to 80% from the bottom of bead core with respect to the distance from the position of the maximum tire width to the bottom of bead core in the equatorial direction.

8. The pneumatic tire according to claim 1, wherein the electronic component is an RFID.

9. The pneumatic tire according to claim 1, wherein the electronic component is embedded at a position of 12 to 40% from a bottom of a bead core with respect to a distance from a position of a maximum tire width to the bottom of bead core in an equatorial direction.

10. The pneumatic tire according to claim 1, wherein the carcass includes a carcass ply, and a lengthwise end of the carcass ply is wrapped around a bead core and is abutted against a surface of the carcass ply that faces outward in the tire axial direction.

11. The pneumatic tire according to claim 10, wherein the electronic component is disposed between the lengthwise end of the carcass ply and a crotch between the carcass ply and a sidewall of the tire.

12. The pneumatic tire according to claim 10, wherein the electronic component is disposed overlapping with the lengthwise end of the carcass ply.

13. The pneumatic tire according to claim 10, wherein the electronic component is disposed between the lengthwise end of the carcass ply and a crotch between the clinch and a chafer of the tire.

14. A pneumatic tire comprising:
a bead reinforcing layer which is provided on an outer side of a carcass of a bead portion in a tire axial direction and reinforces the bead portion from the outer side of the carcass;
a clinch provided on an outer side of the bead reinforcing layer in the tire axial direction; and
an electronic component,
wherein the clinch has a lower rigidity than the bead reinforcing layer,
the electronic component is embedded between the bead reinforcing layer and the clinch,
$E^*$ (1) of the bead reinforcing layer and $E^*$ (2) of the clinch member, at 70° C., satisfy the following two formulas:

$$E^*(1)-E^*(2) \geq 5 \text{ MPa}$$

$$E^*(1)-E^*(2) \leq 80 \text{ MPa,}$$

tan δ (1) of the bead reinforcing layer and tan δ (2) of the clinch member, at 70° C., satisfy the following two formula:

$$\tan \delta(1)+\tan \delta(2) \leq 0.4$$

$$\tan \delta(1)+\tan \delta(2) \geq 0.1,$$

the bead reinforcing layer includes a rubber composition including a curable resin, carbon black, and sulfur,
a content of the curable resin in the rubber composition is in a range of 5 parts by mass to 25 parts by mass,
a content of the carbon black in the rubber composition is in a range of 30 parts by mass to 70 parts by mass, and
a content of the sulfur in the rubber composition is in a range of 1 part by mass to 8 parts by mass.

15. A pneumatic tire comprising:
a bead reinforcing layer which is provided on an outer side of a carcass of a bead portion in a tire axial direction and reinforces the bead portion from the outer side of the carcass;
a clinch provided on an outer side of the bead reinforcing layer in the tire axial direction; and
an electronic component,
wherein the clinch has a lower rigidity than the bead reinforcing layer,
the electronic component is embedded between the bead reinforcing layer and the clinch,
$E^*$ (1) of the bead reinforcing layer and $E^*$ (2) of the clinch member, at 70° C., satisfy the following two formulas:

$$E^*(1)-E^*(2) \geq 5 \text{ MPa}$$

$$E^*(1)-E^*(2) \leq 80 \text{ MPa,}$$

tan δ (1) of the bead reinforcing layer and tan δ (2) of the clinch member, at 70° C., satisfy the following two formula:

$$\tan \delta(1)+\tan \delta(2) \leq 0.4$$

$$\tan \delta(1)+\tan \delta(2) \geq 0.1,$$

the clinch includes a rubber composition including isoprene-based rubber and butadiene rubber,
a content of the isoprene-based rubber in the rubber composition is in a range of 10 parts by mass to 80 parts by mass, and
a content of the butadiene rubber in the rubber composition is in a range of 20 parts by mass to 90 parts by mass.

* * * * *